US009026754B2

United States Patent
Matsushita et al.

(10) Patent No.: US 9,026,754 B2
(45) Date of Patent: May 5, 2015

(54) STORAGE APPARATUS AND DATA MANAGEMENT METHOD

(75) Inventors: Takaki Matsushita, Yokohama (JP); Akira Deguchi, Yokohama (JP); Hiroaki Akutsu, Yokohama (JP); Akihiko Araki, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 234 days.

(21) Appl. No.: 13/511,509

(22) PCT Filed: May 11, 2012

(86) PCT No.: PCT/JP2012/003116
§ 371 (c)(1),
(2), (4) Date: May 23, 2012

(87) PCT Pub. No.: WO2013/168202
PCT Pub. Date: Nov. 14, 2013

(65) Prior Publication Data
US 2013/0305003 A1 Nov. 14, 2013

(51) Int. Cl.
*G06F 12/16* (2006.01)
*G06F 3/06* (2006.01)
*G06F 11/14* (2006.01)

(52) U.S. Cl.
CPC .......... *G06F 3/0608* (2013.01); *G06F 11/1458* (2013.01); *G06F 3/061* (2013.01); *G06F 3/0644* (2013.01); *G06F 3/065* (2013.01); *G06F 3/0665* (2013.01); *G06F 3/0671* (2013.01)

(58) Field of Classification Search
CPC .............. G06F 9/30072; G06F 9/3017; G06F 9/30181; G06F 9/30145; G06F 9/30094; G06F 9/30058

USPC ......................................... 711/162, 114, 226
See application file for complete search history.

(56) References Cited

U.S. PATENT DOCUMENTS

| | | | |
|---|---|---|---|
| 6,405,295 B1 * | 6/2002 | Bando ........................... 711/165 |
| 2006/0168411 A1 * | 7/2006 | Ohno et al. ................... 711/162 |
| 2008/0049276 A1 * | 2/2008 | Abe .............................. 358/524 |
| 2010/0306498 A1 * | 12/2010 | Shiga ............................ 711/203 |
| 2010/0325523 A1 * | 12/2010 | Slyz et al. ..................... 714/773 |
| 2011/0154102 A1 * | 6/2011 | Akutsu et al. ................. 714/6.1 |

FOREIGN PATENT DOCUMENTS

| | | |
|---|---|---|
| EP | 0 375 188 A2 | 6/1990 |
| EP | 0 747 806 A2 | 12/1996 |
| JP | 2012-504795 A | 2/2012 |
| WO | WO 2010/086900 A1 | 8/2010 |

OTHER PUBLICATIONS

Moulton, Back to Basics: Data Compression, Jan. 26, 2012, pp. 1-8.*
PCT International Search Report and Written Opinion on application PCT/JP2012/003116 mailed Jan. 23, 2013; 12 pages.

* cited by examiner

*Primary Examiner* — Kevin Verbrugge
(74) *Attorney, Agent, or Firm* — Foley & Lardner LLP

(57) ABSTRACT

Storage apparatus and data management methods provide for high-speed copying of a compressed data volume. A control unit of the storage apparatus divides a pool into a plurality of chunks including a plurality of pages storing data, compresses data which is written to a logical volume by a host, and assigns one of the plurality of chunks to a compressed data logical volume which stores the compressed data. When the compressed data logical volume is copied, the control unit makes a page length of the chunk assigned to the compressed data logical volume that is a copy source equivalent to a page length of the chunk assigned to the compressed data logical volume that is the copy destination.

12 Claims, 17 Drawing Sheets

COMPRESSED LU MAPPING TABLE

| LOGICAL ADDRESS | COMPRESSION FLAG | STORAGE ADDRESS |
|---|---|---|
| 0x1000 | 1 | 0x100 |
|  |  | 0x110 |
|  |  | 0x120 |
|  |  | NULL |
| 0x2000 | 0 | 0x200 |
|  |  | 0x210 |
|  |  | 0x220 |
|  |  | 0x230 |
| ... | ... | ... |
| 1361 | 1362 | 1363 |

510
511
136

UNUSED AREA MANAGEMENT BITMAP — 137

FIG.7

CHUNK MANAGEMENT TABLE

| CHUNK NUMBER | PAGE SIZE | LU# | COMPRESSED LU MAPPING TABLE ADDRESS | UNUSED AREA MANAGEMENT BITMAP ADDRESS |
|---|---|---|---|---|
| 1 | 64kB | NULL | NULL | NULL |
| 2 | 16kB | 5 | 0X1000 | 0X100000 |
| 3 | 16kB | 6 | 0X1000 | 0X100000 |
| ... | ... | .. | | |
| 1381 | 1382 | 1383 | 1384 | 1385 |

138

STORAGE APPARATUS AND DATA MANAGEMENT METHOD

TECHNICAL FIELD

The present invention relates to a storage apparatus and a data management method and is suitably applied to a storage apparatus and data management method with which data is compressed and stored.

BACKGROUND ART

As a system for storing large-scale data from a host, a storage apparatus which controls data I/Os from the host is used. The storage apparatus is an apparatus for managing, in a RAID (Redundant Array of Independent Inexpensive Disks), a multiplicity of drives arranged as an array. At least one or more logical areas (hereinafter these areas may also be described as logical volumes) are formed in physical storage areas which are provided by the multiplicity of drives installed in the storage apparatus and the logical volumes are provided to the host.

In order to store large-scale data from a host, a storage apparatus holds a large capacity storage area, but data from hosts has gradually increased over the years and there is a need for efficient storage of large-scale data due to problems relating to the size and cost of a storage apparatus.

Therefore, a reversible data compression system, which makes it possible to reduce the amount of data and replace same with other small-size data while maintaining the amount of information of substantial quality in the data, has been applied to a storage apparatus.

For example, PTL1 discloses a storage system with which data is compressed and the optimum storage position is selected on the basis of the compressed data size.

CITATION LIST

Patent Literature

PTL 1: Japanese Patent KOHYO Publication No. 2012-504795

SUMMARY OF INVENTION

Technical Problem

Further, if an uncompressed data volume (uncompressed VOL) is compressed to generate a compressed data volume (compressed VOL), the usage capacity of the storage area decreases. Hence, a shortening of the time for copying the compressed VOL in comparison with an uncompressed VOL is to be expected. However, with the storage system of PTL1, the continuity of the data in the storage area cannot be guaranteed and high-speed copying of the compressed VOL is sometimes impossible.

The present invention was conceived in view of the above points and proposes a storage apparatus and a data management method with which high-speed copying of a compressed data volume is possible.

Solution to Problem

In order to achieve the foregoing object, the present invention proposes a storage apparatus which is coupled via a network to a host which issues data I/O requests, comprising a storage unit which stores data which is read/written by the host, and a control unit which provides a virtualized logical volume to the host, manages a storage area which is provided by the storage unit as a pool, and assigns a storage area of the pool to the logical volume on the basis of the data I/O requests from the host, wherein the control unit divides the pool into a plurality of chunks comprising a plurality of pages storing data, wherein the control unit compresses data which is written to the logical volume by the host and assigns one of the plurality of chunks to a compressed data logical volume which stores the compressed data, and wherein, when the compressed data logical volume is copied, the control unit makes the page length of the chunk which is assigned to the compressed data logical volume which is the copy source the same as the page length of the chunk which is assigned to the compressed data logical volume which is the copy destination.

With this configuration, a storage apparatus is provided which provides a virtualized logical volume to the host, manages a storage area which is provided by the storage unit as a pool, and assigns a storage area of the pool to the logical volume on the basis of the data I/O requests from the host. The storage apparatus divides the pool into a plurality of chunks comprising a plurality of pages storing data, compresses data which is written to the logical volume by the host and assigns one of the plurality of chunks to a compressed data logical volume which stores the compressed data, and, when the compressed data logical volume is copied, makes the page length of the chunk which is assigned to the compressed data logical volume which is the copy source the same as the page length of the chunk which is assigned to the compressed data logical volume which is the copy destination. As a result, when the logical volume which stores the compressed data is copied, high-speed copying is possible without the need for random-access reading, compressed data expansion, or reconstruction of the compressed LU mapping table, and so forth.

Advantageous Effects of Invention

The present invention enables high-speed copying of a compressed data volume.

BRIEF DESCRIPTION OF DRAWINGS

FIG. 7 is a table showing content of a chunk management table according to this embodiment.

DESCRIPTION OF EMBODIMENTS

An embodiment of the present invention will be described in detail hereinbelow with reference to the drawings.

(1) Computer System Configuration

Figure 1:
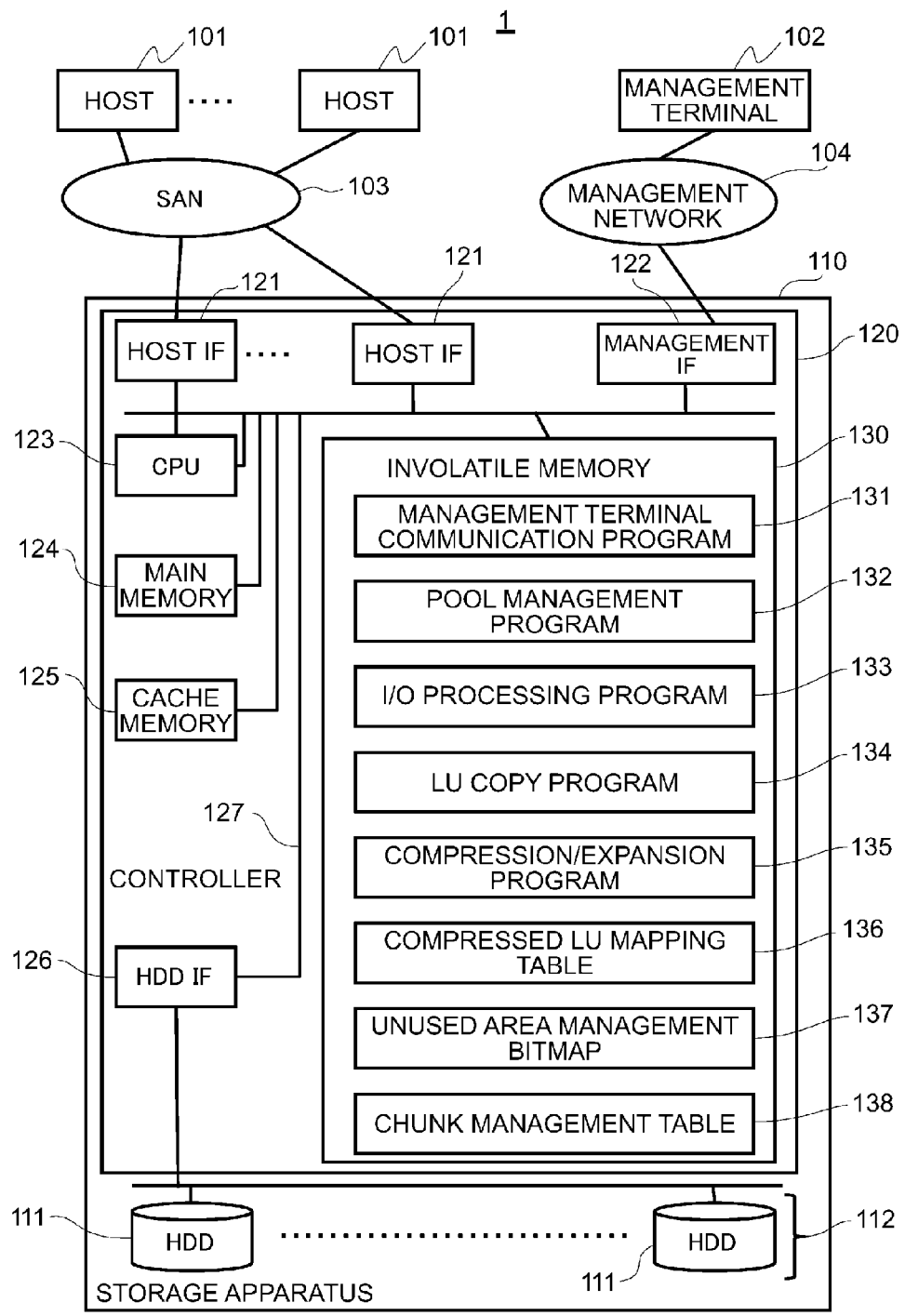
FIG. 1 is a block diagram showing a hardware configuration of a computer system according to an embodiment of the present invention.

FIG. 1 is a block diagram showing a hardware configuration of a computer system according to a first embodiment of the present invention. As shown in FIG. 1, a plurality of hosts 101 and a storage apparatus 110 are coupled to a network 103 such as a SAN (Storage Area Network), for example. Further, a management terminal 102 and a storage apparatus 110 are coupled to a management network 104 such as a LAN (Local Area Network), for example.

The host 101 is a computer which issues I/O requests (write requests or read requests) to the storage apparatus 110. The management terminal 102 is a terminal for managing the storage apparatus 110.

(2) Storage Apparatus Configuration

The storage apparatus 110 comprises a controller 120 and a storage device group 112. The storage device group 112 is configured from a plurality of HDD 111. Note that, a physical storage device of another type, for example a flash memory device or the like, may also be adopted instead of the HDD 111.

The controller 120 receives an I/O request which is issued by the host 101 and accesses any one or more of the HDD 111 in accordance with the processing of the I/O request. The controller 120 comprises a plurality of host IF 121, a management IF 122, a CPU 123, a main memory 124, a cache memory 125, an involatile memory 130, and an HDD IF 126. Further, these parts are all connected by an internal bus 127.

The host IF 121 is an interface circuit for communicating with an external device such as the host 101 via the SAN 103. The host IF 121 receives I/O requests from the host 101. The management IF 122 is an interface circuit for communicating with external devices such as the management terminal 102 via the management network 104. The HDD IF 126 is an interface circuit for communicating with the HDD 111.

The cache memory 125 is a volatile memory, for example. The cache memory 125 temporarily stores write target data corresponding to a write request received from the host 101 and read target data which corresponds to a read request received from the host 101.

The involatile memory 130 stores a management terminal communication program 131, a pool management program 132, an I/O processing program 133, an LU copy program 134, a compression/expansion program 135, a compressed LU mapping table 136, an unused area management bitmap 137, and a chunk management table 138. Computer programs which are stored in the involatile memory 130 are loaded into the main memory 124 and these programs are executed by the CPU 124.

The management terminal communication program 131 is a program for communicating with the management terminal 102 (more specifically, a storage communication program 212 of the management terminal 102 which will be described subsequently). The pool management program 132 is a program for performing pool management-related processing such as virtualization of a plurality of HDD. The I/O processing program 133 is a program for performing I/O-related processing such as reading and writing of data from a pool. The LU copy program 134 is a program which copies LUs (Logical Units) which are data volumes in accordance with instructions from the management terminal 102. The compression/expansion program 135 compresses or expands data elements which are input. Note that, at least one of compression and expansion may also be realized by a hardware circuit. Various programs and various tables will be described in detail subsequently. Further, in the following description, the processing which is performed by the computer programs is actually carried out by the CPU 123 which executes the computer programs.

(3) Management Terminal Configuration

Figure 2:
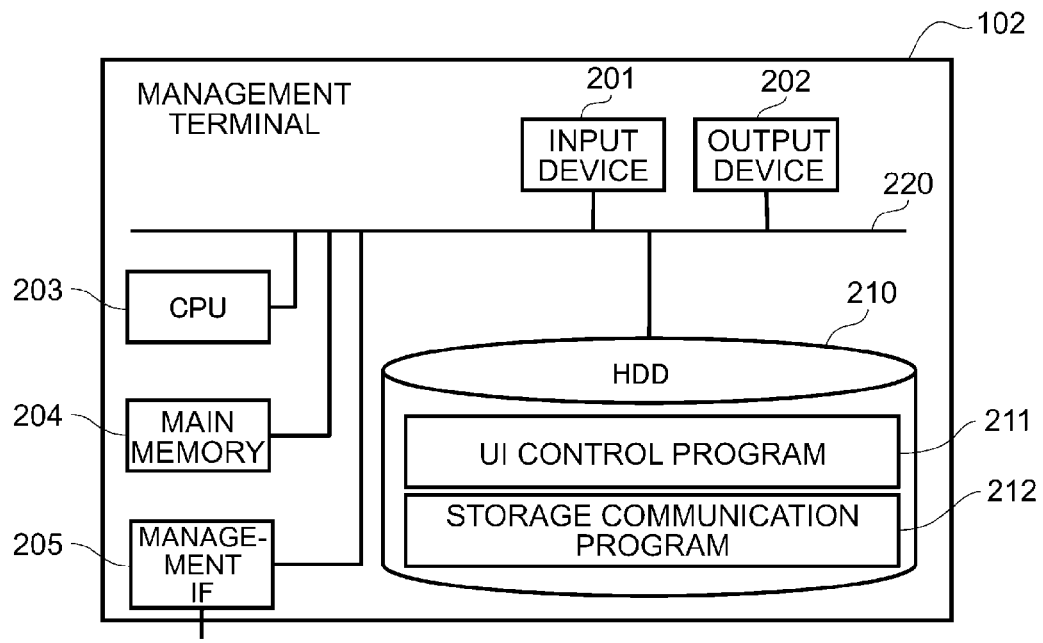
FIG. 2 is a block diagram showing a configuration of a management terminal according to this embodiment.

FIG. 2 is a block diagram showing a configuration of the management terminal 102.

The management terminal 102 is a computer and, as shown in FIG. 2, comprises an input device 201, an output device 202, a CPU 203, a main memory 204, a management IF 205, and an HDD 210, for example.

The input device 201 is a pointing device (a mouse, for example) and a keyboard and so on. Further, the output device 202 is a display device, for example.

The HDD 210 (may be a storage device of another type) stores a user interface control program (hereinafter called an UI control program) 211 and a storage communication program 212. These computer programs are loaded into the main memory 204 and the loaded programs are executed by the CPU 203.

The management IF 205 is an interface circuit for communicating with external devices such as the storage apparatus 110 via the management network 104. The UI control program 211 is a program for displaying a GUI (Graphical User Interface) on the output device 202. The storage communication program 212 is a computer program for communicating with the storage apparatus 110. The UI control program 211 and the storage communication program 212 will be described in detail subsequently.

Figure 3:
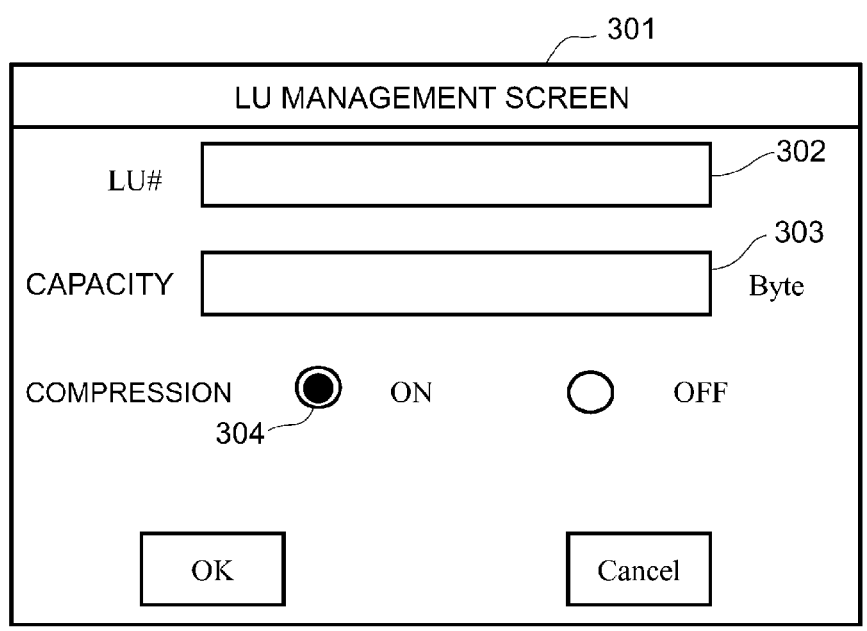
FIG. 3 is a conceptual diagram showing an example of an LU management screen according to this embodiment.

FIG. 3 is a conceptual diagram showing an example of the LU management screen.

An LU management screen 301 is a GUI which is displayed by the UI control program 212. The LU management screen 301 comprises an LU# (LU number) input field 302, an input field 303 for the capacity of the LU, and compression selection buttons 304 for selecting whether data stored in the LU is to be compressed. The user uses the input device 201 shown in FIG. 2 to input the number of the desired logical volume (LU number) in the LU# input field 302 and to input the LU capacity in the LU capacity input field 303. In addition, the user selects and presses the compression selection button 304 compression on or compression off.

When the OK button is pressed by the user, the storage communication program 212 reports the LU number which has been input in the LU# input field 302, information indicating the capacity which is input in the LU capacity input field 303, and information (compression on or compression off) which corresponds to the designated compression selection button 304 to the storage apparatus 110. The management terminal communication program 131 receives this information and the pool management program 132 assigns a storage area which is used by the LU designated by the user.

If, on the other hand, the user has already designated a generated LU# in the LU# input field 302, the LU capacity input field 303 may enter a state where inputs from the user are not accepted and the current LU usage amount may be displayed. In addition, the compression selection button 304 may also be displayed in a state where the current selection state (compression on or compression off) is selected.

For example, suppose that the OK button is pressed in order to change the selection of an LU in a compression off state to compression on. In this case, the storage communication program 212 reports the input information to the storage apparatus 110. Further, when compression on is designated for the LU storing the uncompressed data, the storage apparatus 110 compresses the already stored uncompressed data and stores the compressed data in the pool once again.

More specifically, the management terminal communication program 131 receives the information from the management terminal 102 and the pool management program 132 assigns a storage area for storing the compressed data. The I/O processing program 133 reads the uncompressed data with the designated LU number from the management terminal 102, generates compressed data as a result of the compression/expansion program 135 compressing the data, and the I/O processing program 133 stores the compressed data in a compressed data storage area (compressed LU chunk) assigned by the pool management program 132. After repeatedly executing the foregoing processing for all the uncompressed data, the area storing the uncompressed data is then unused. It is therefore recognized by the pool management program 132 that the unused area is not being used and the usage amount of the compressed data storage area is displayed as the LU usage amount which is displayed on the LU management screen 301.

Furthermore, suppose that the OK button is pressed in order to change the selection of an LU in a compression on state to compression off. In this case, the storage communication program 212 reports the input information to the storage apparatus 110. When compression off is designated for a compressed LU storing compressed data is designated, the storage apparatus 110 expands already stored compressed data and stores the expanded data in the pool once again.

More specifically, the management terminal communication program 131 receives the information from the management terminal 102 and the pool management program 132 assigns a storage area for storing uncompressed data. The I/O processing program 133 reads the compressed data with the designated LU number from the management terminal 102, generates uncompressed data as a result of the compression/expansion program 135 expanding the data, and the I/O processing program 133 once again stores this data in an uncompressed data storage area (an uncompressed LU chunk) assigned by the pool management program 132. After repeatedly executing the foregoing processing for all the compressed data, the area storing the compressed data is then unused. It is therefore recognized by the pool management program 132 that the unused area is not being used and the usage amount of the uncompressed data storage area is displayed as the LU usage amount which is displayed on the LU management screen 301.

(4) Overview of Compression Processing

Figure 4:
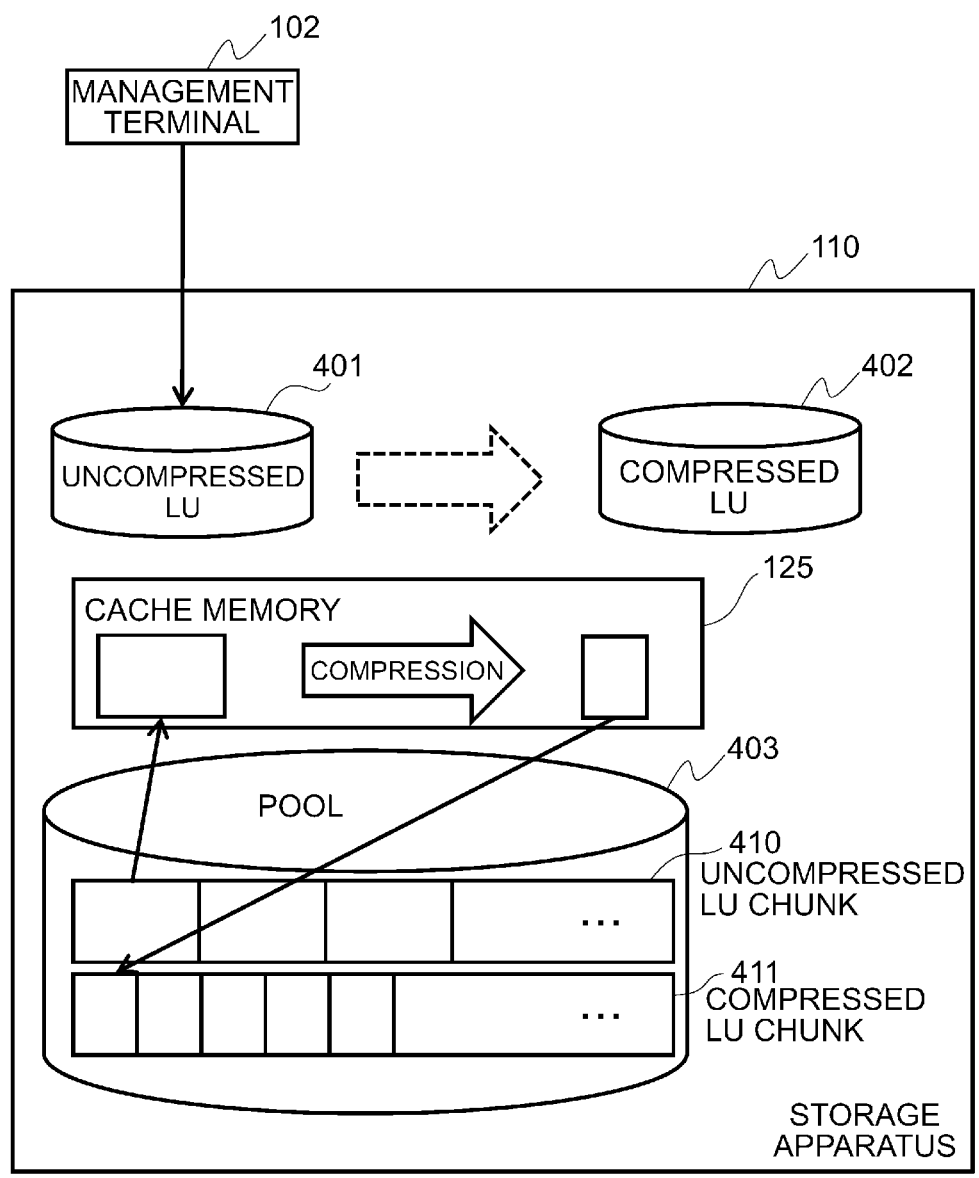
FIG. 4 is a conceptual diagram illustrating initial compression processing according to this embodiment.

FIG. 4 is a conceptual diagram illustrating initial compression processing. More specifically, FIG. 4 shows an overview of initial compression processing in the storage apparatus 110 in a case where compression on has been designated for an LU (uncompressed LU 401) storing uncompressed data via the LU management screen 301 in FIG. 3.

The uncompressed LU 401 is an LU in which uncompressed data is stored. A compressed LU 402 is an LU in which uncompressed data stored in the uncompressed LU 401 is compressed and the compressed data is stored. The LU numbers which identify the uncompressed LU 401 and the compressed LU 402 may be the same or different LU numbers. That is, the fact that the uncompressed LU 401 and the compressed LU 402 have the same LU number means that, once the initial compression processing is complete, the LU number of the uncompressed LU 401 is handed over to the compressed LU 402. If, on the other hand, the uncompressed LU 401 and the compressed LU 402 have different LU numbers, the LU number of the compressed LU 402 is designated by the management terminal 102.

The pool 403 is a pool area for storing real data which is written to the uncompressed LU 401 and the compressed LU 402. The pool 403 may be a so-called thin provisioning volume to which capacity is dynamically assigned in small amounts at a time. Further, the pool 403 is used by being divided into a plurality of chunks. The page length is set for each chunk and the I/O processing on the chunks is processed by taking the page length as the smallest unit.

Uncompressed LU chunks 410 are areas for storing write data written to the uncompressed LU 401. Write data for a plurality of uncompressed LU 401 can also be stored in the uncompressed LU chunks 410.

Compressed LU chunks 411 are areas for storing write data written to the compressed LU 402. Further, in a case where compression of the uncompressed LU 401 is instructed by the management terminal 102, [the compressed LU chunks 411] are areas in which data which is stored in the uncompressed LU chunks 410 is compressed and the compressed data is stored. The compressed LU chunks 411 differ from the uncompressed LU chunks 410; only write data for one compressed LU 402 is stored in a single compressed LU chunk 411, and write data of a plurality of compressed LU 402 is not stored. Thus, only data of one type of compressed LU is stored in a compressed LU chunk. As a result, when a compressed LU is copied, chunks can be copied sequentially, and hence the speed required for copying can be improved.

For example, when compression on is designated for the uncompressed LU 401 via the management terminal 102, the storage apparatus 110 reads uncompressed data from the uncompressed LU chunk 410 which stores real data of the uncompressed LU 401 to the cache memory 125. The storage apparatus 110 then performs processing to compress the read uncompressed data and stores the compressed data in the compressed LU chunk 411. Further, the storage apparatus 110 creates or updates various tables to enable access by the host 101 to the data in the compressed LU chunk 411 from the compressed LU 402. More specifically, the storage apparatus 110 creates and updates a compressed LU mapping table (illustrated in FIG. 5 hereinbelow) which associates the logical address of the compressed LU 402 with the storage address of the compressed LU chunk 411, and an unused area management bitmap (illustrated in FIG. 6 hereinbelow). Further, the storage apparatus 110 updates the chunk management table (illustrated in FIG. 7 hereinbelow).

(5) Content of Various Tables

Figures 5, 6:
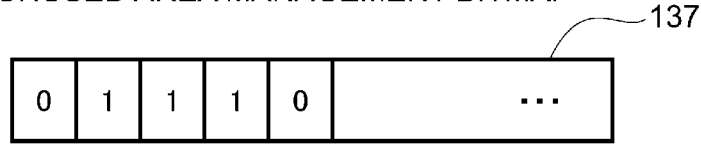
FIG. 5 is a table showing the content of a compressed LU mapping table according to this embodiment.
FIG. 6 is a conceptual diagram showing content of an unused area management bitmap according to this embodiment.

FIG. 5 is a table showing the content of the compressed LU mapping table. The compressed LU mapping table 136 is a table for managing the correspondence relationships between the logical address of the compressed LU 402 and storage addresses of the compressed LU chunks 411. As shown in FIG. 5, the compressed LU mapping table 136 is configured from a logical address field 1361, a compression flag field 1362, and a storage address field 1363.

The logical address field 1361 stores the logical addresses of the compressed LU 402. The host 101 uses these logical addresses to request I/O processing from the storage apparatus 110.

The compression flag field 1362 stores information indicating whether or not the data is compressed. If data is not compressed, 0 is stored [in this field], and if data is compressed, 1 is stored.

The storage address field 1363 stores offset addresses in the compressed LU chunks 411. Storing the offset addresses of the compressed LU chunk 411 in the storage address field 1363 permits sharing of the compressed LU mapping table when copying the compressed LU 402, and hence the amount of memory consumption is curbed.

While the size of compression target data is of a fixed length, the compressed data has a variable length. Therefore, an entry is added to the logical address field 1361 in the table for each compression target data size of a fixed length. The units of the compression target data sizes may be the same as the page size of the uncompressed LU chunk 410 or may be a multiple of the page size.

Meanwhile, entries are added to the storage address field 1363 in the table in page size units of the compressed LU chunk 411. Therefore, if the compression target data size is 64 kB and the page size of the compressed LU chunk 411 is 16 kB, for example, there is a single entry in the logical address field 1361 in the compressed LU mapping table 136, while the storage address field 1363 holds four entries.

Further, since the compressed data is of a variable length, not all the information need be stored in the storage address field 1363. For example, the number of pages used in the compressed LU chunk 411 is small in a case where the compression effect is large, and hence there is also little information held in the storage address field 1363. NULL is held in an unused entry 510 of the storage address field 1363.

On the other hand, when the number of pages used in the compressed LU chunk 411 is large in a case where the compression effect is small, all the information is stored in the storage address field 1363. As shown by entry 511 in FIG. 5, if there is no compression effect, data is written to the compressed LU chunk 411 while still remaining uncompressed. The compression flag field 1362 stores information indicating whether the data is uncompressed data or compressed data. It is possible to determine whether data has been compressed by referencing the compression flag field 1362.

FIG. 6 is a conceptual diagram showing the content of an unused area management bitmap. One unused area management bitmap 137 exists for one compressed LU chunk. The unused area management bitmap 137 is a bitmap in which page usage states in chunks are stored. As shown in FIG. 6, the unused area management bitmap stores 1 if a page is used and 0 if pages are unused.

As shown in FIG. 4, in a case where initial compression from an uncompressed LU to a compressed LU is executed, because a compressed LU chunk 411 is newly secured, [data] is continuously stored in the order of compression. Therefore, the unused area management bitmap 137 is continuously written from the start to 1 and, when the write processing to the compressed LU 402 is repeated, there is an increase or reduction in the data size after recompression due to updates to existing stored data.

If the [data] size after recompression is large, 0 is detected from the unused area management bitmap 137, data corresponding to the increase is stored in the corresponding unused page, and the entry of the unused area management bitmap 137 is updated to 1. Furthermore, if the [data] size after recompression is small and an unused page is generated in the compressed LU chunk 411, the entry of the unused area management bitmap 137 corresponding to the unused page is updated from 1 to 0.

FIG. 7 is a table showing the content of a chunk management table. The chunk management table 138 is a table for managing chunk-related information. The chunk management table 138 is configured from a chunk number field 1381, a page size field 1382, an LU number field 1383, a compressed LU mapping table address field 1384, and an unused area management bitmap address field 1385.

The chunk number field 1381 stores information representing target chunk identifiers. The page size field 1382 stores the page sizes of the chunks. For example, in the case of the uncompressed LU chunk 410, information indicating 64 kB is stored in the page size field 1382 and in the case of the compressed LU chunk 411, information indicating 16 kB is stored in the page size field 1382.

The LU number field 1383 stores LU numbers which correspond to the data in the chunks. The LU number field 1383 is information which is added only in the case of a compressed LU chunk. In the case of an uncompressed LU chunk, because data for a plurality of LU is stored in a single chunk, as mentioned earlier, a single LU is not specified for a single chunk as it is for a compressed LU chunk. NULL, which indicates a blank field, is therefore stored as the LU number corresponding to the uncompressed LU chunk.

The compressed LU mapping table address field 1384 stores addresses where the compressed LU mapping table corresponding to the chunk is stored. Further, the unused area management bitmap address field 1385 stores addresses where the unused area management bitmap 137 corresponding to the chunk is stored. The compressed LU mapping table address 1384 and the unused area management bitmap address 1385 are information which is added only if the chunk is a compressed LU chunk. This is because a compressed LU mapping table 136 and an unused area management bitmap 137 which correspond to the uncompressed LU chunk do not exist.

Figure 8:
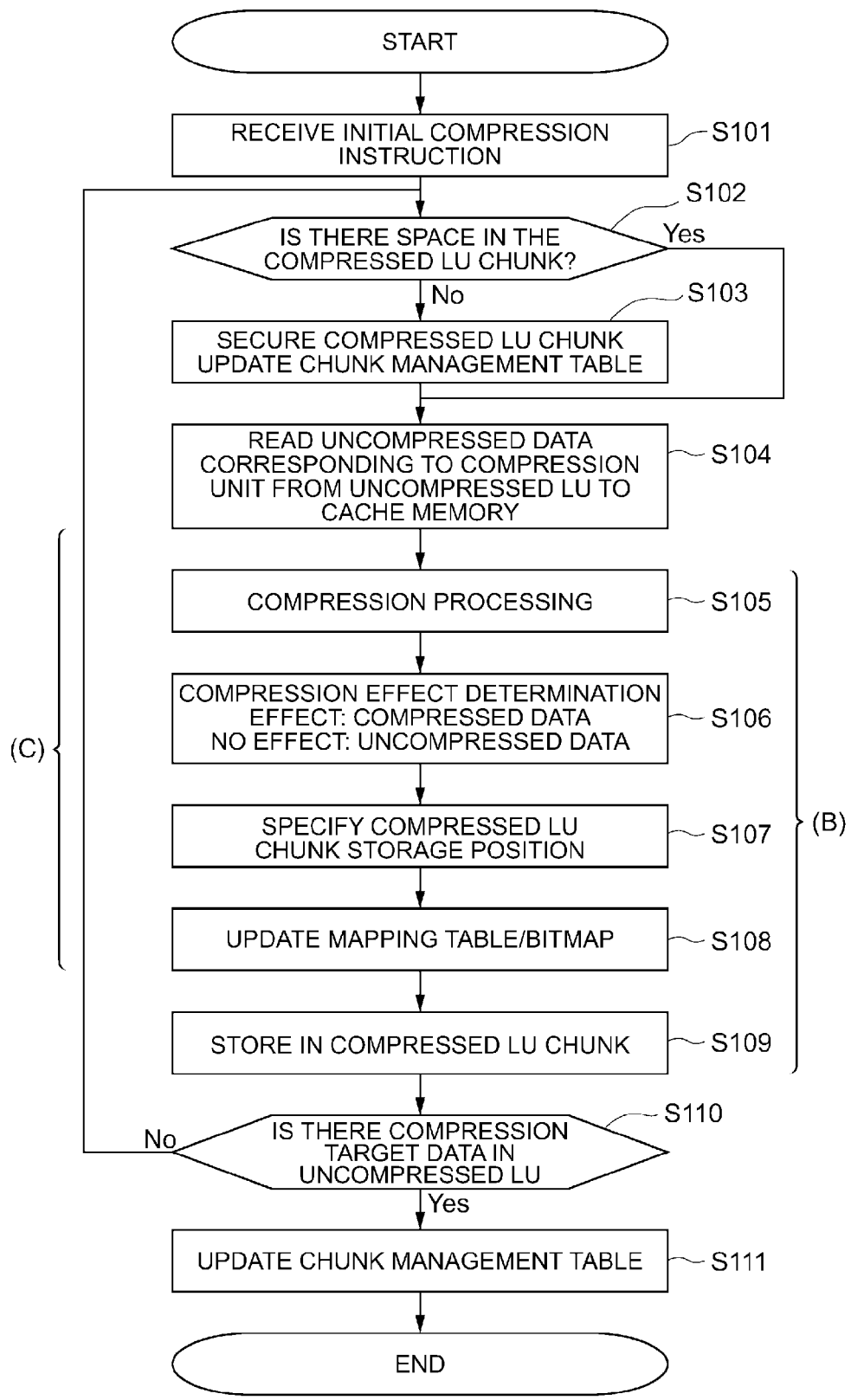
FIG. 8 is a flowchart showing an initial compression procedure according to this embodiment.

(6) Details of Compression Processing (6-1) Details of Initial Compression Processing FIG. 8 is a flowchart showing an initial compression procedure in a case where compression of an uncompressed LU 401 is instructed by the management terminal 102.

First, the storage apparatus 110 receives the initial compression instruction from the management terminal 102 (S101). The pool management program 132 of the storage apparatus 110 then determines whether or not there is space in the compressed LU chunk (S102).

If it is determined in step S102 that there is no space in the compressed LU chunk, the pool management program 132 secures a compressed LU chunk and updates the chunk management table 138 (S103). For example, directly after there is an initial compression instruction from the management terminal 102, there is a state where a compressed LU chunk has not been generated, and hence the pool management program 132 secures a compressed LU chunk. Even when a compressed LU chunk has been used up and there is no space in the compressed LU chunk, the pool management program 132 secures a new compressed LU chunk. Further, if a new compressed LU chunk is secured, the pool management program 132 adds information on the secured chunk to the chunk management table 138.

If, on the other hand, at least the compression target data size can be stored in the compressed LU chunk, the pool management program 132 executes the processing of step S104.

Further, the I/O processing program 133 of the storage apparatus 110 reads at least the compression target data size from the start address of the uncompressed LU to the cache memory 125 (S104).

The compression/expansion program 135 of the storage apparatus 110 then compresses the uncompressed data in the cache memory 125 which was read in step S104 (S105). The compression/expansion program 135 then determines whether there is a compression effect from the data size after the compression which is executed in step S105 (S106). If it is determined that there is a compression effect for the post-compression data, the compression/expansion program 135 executes the subsequent processing by taking the compressed data as a target. If, on the other hand, it is determined that there is no compression effect, the compression/expansion program 135 discards the compressed data and executes the subsequent processing by taking the uncompressed data as a target.

Further, the pool management program 132 of the storage apparatus 110 specifies the storage position in the compressed LU chunk from the unused area management bitmap 137 (S107). The pool management program 132 then adds an entry for the data processed immediately before to the compressed LU mapping table 136. Further, the pool management program 132 updates the unused area management bitmap 137 (S108).

The I/O processing program 133 of the storage apparatus 110 then stores data in the compressed LU chunk specified in step S107 (S109).

The pool management program 132 of the storage apparatus 110 then determines whether or not compression target data remains in the uncompressed LU (S110). If it is determined in step S110 that compression target data remains in the uncompressed LU, the pool management program 132 repeats the processing of step S102 and subsequent steps. If, on the other hand, it is determined in step S110 that no compression target data remains in the uncompressed LU, the pool management program 132 releases the uncompressed LU chunk if the uncompressed LU chunk can be released and deletes the entry for the uncompressed LU chunk from the chunk management table 138 (S111).

(6-2) Details of Read Processing

Figure 9:
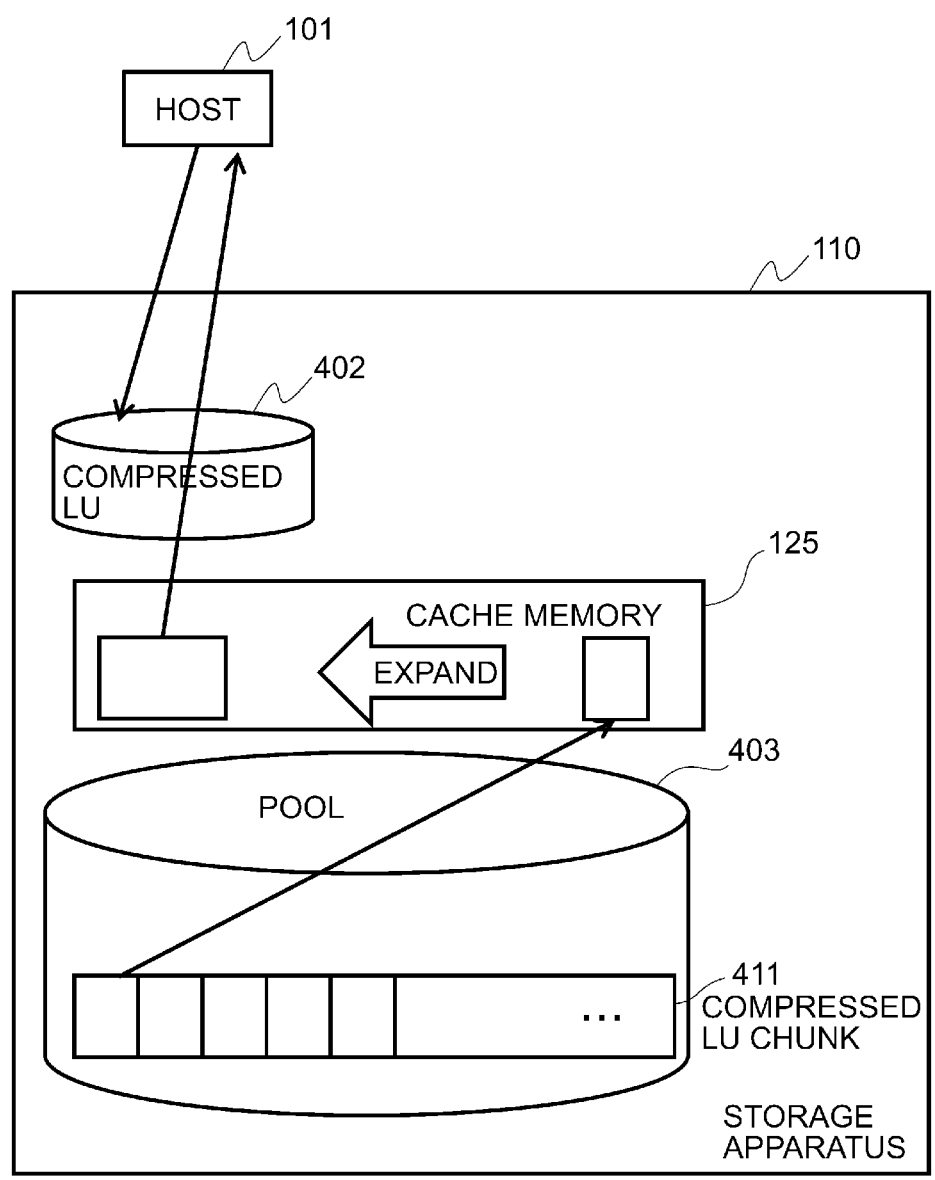
FIG. 9 is a conceptual diagram illustrating data read processing according to this embodiment.

FIG. 9 is a conceptual diagram illustrating data read processing from a compressed LU. As shown in FIG. 9, the storage apparatus 110, which receives a read request of the compressed LU 402 from the host 101, references the compressed LU mapping table 136 (not shown) and reads the data from the compressed LU chunk 411 to the cache memory 125. If the data which is read from the cache memory 125 is compressed data, the storage apparatus 110 executes expansion processing and transfers only a reading range from the expanded data to the host 101.

Figure 10:
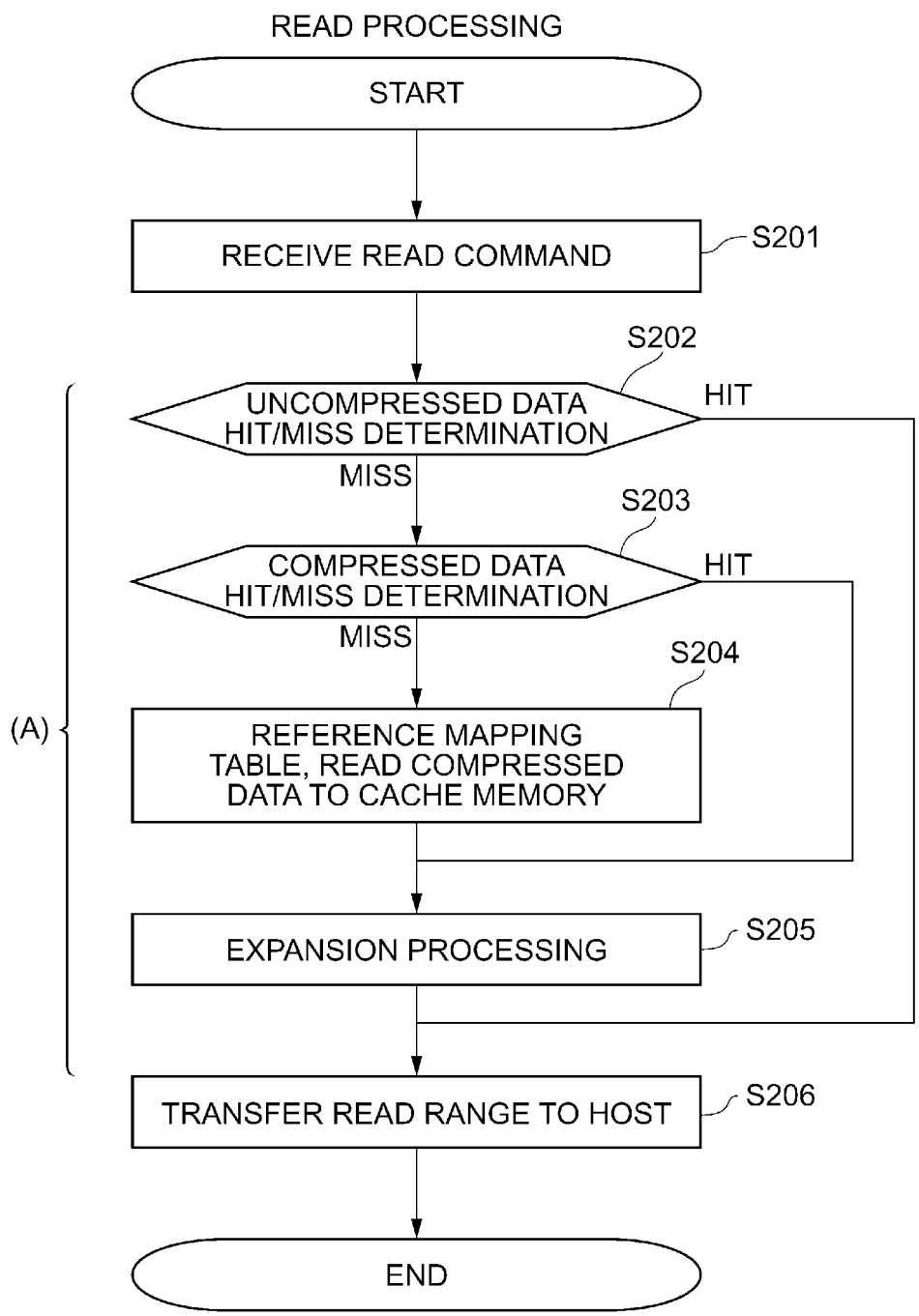
FIG. 10 is a flowchart showing data read processing according to this embodiment.

FIG. 10 is a flowchart showing processing to read data from the compressed LU 402. As shown in FIG. 10, the storage apparatus 110 receives a read request from the host 101 (S201). The I/O processing program 133 of the storage apparatus 110 then performs a cache hit/miss determination for the read data (uncompressed data) and determines whether or not read data exists in the cache memory 125 (S202).

It a cache hit is determined in step S202, that is, if read data exists in the cache memory 125, the I/O processing program 133 executes the processing of step S206.

If, on the other hand, a cache miss is determined in step S202, that is, if it is determined that no read data exists in the cache memory 125, the I/O processing program 133 performs a cache hit/miss determination for the compressed data (S203). More specifically, the I/O processing program 133 references the compressed LU mapping table (not shown), acquires the storage address of the compressed data, and determines whether or not there is compressed data at the corresponding cache memory address.

If a cache hit is determined in step S203, that is, if compressed data corresponding to the read data exists in the cache memory 125, the I/O processing program 133 executes the processing of step S205. If, on the other hand, a cache miss is determined in step S203, that is, if compressed data corresponding to the read data does not exist in the cache memory 125, the I/O processing program 133 references the compressed LU mapping table and reads the data from the compressed LU chunk to the cache memory 125 (S204).

The compression/expansion program 135 then executes expansion processing if the data read in step S204 has been compressed (S205) but does not perform expansion processing if the data read in step S204 is uncompressed.

The I/O processing program 133 then specifies a reading range from the uncompressed data in the cache memory 125, transfers this range to the host (S206), and ends the read processing.

(6-3) Details of Write Processing

Figure 11:
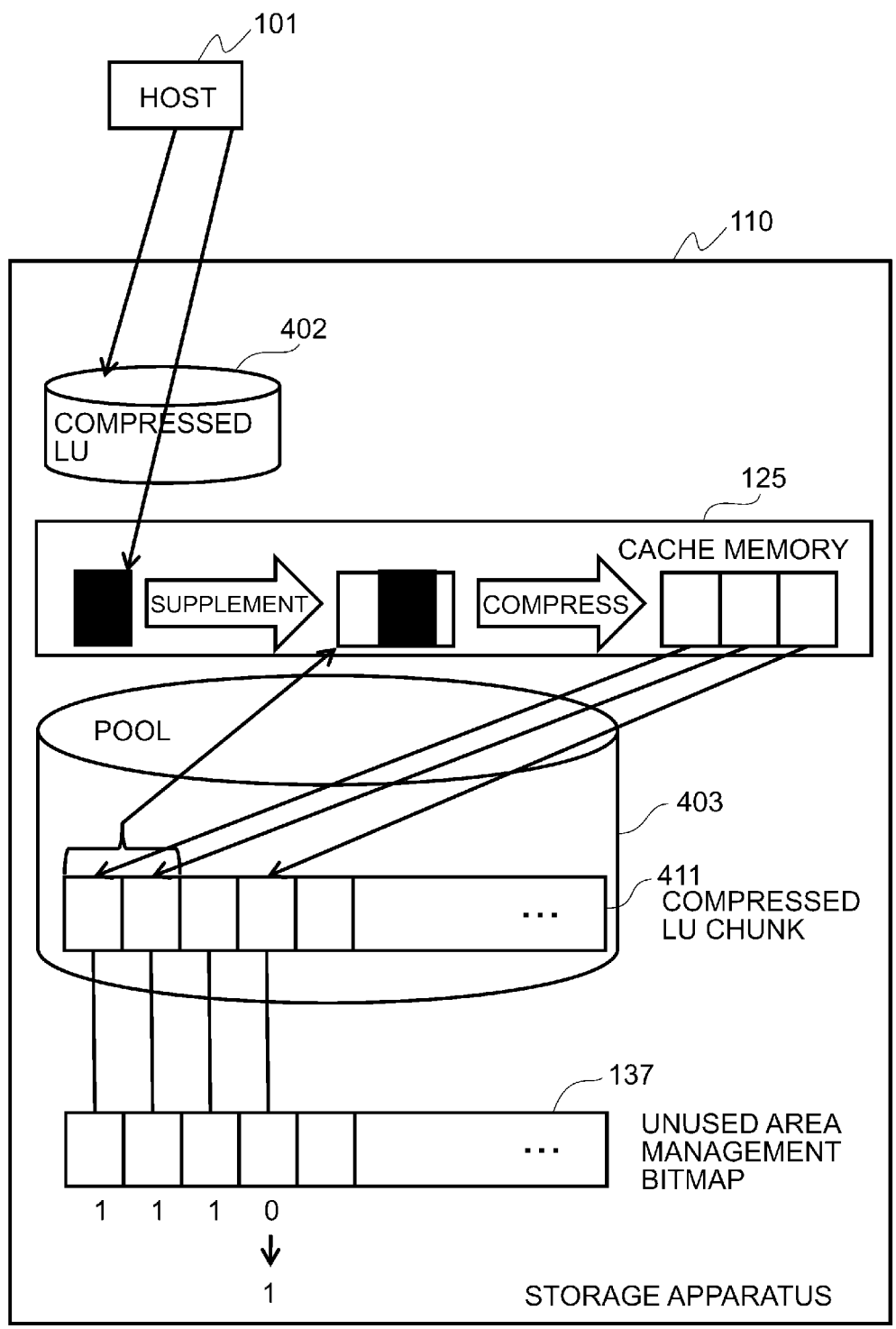
FIG. 11 is a conceptual diagram illustrating data write processing according to this embodiment.

FIG. 11 is a conceptual diagram illustrating processing to write data to the compressed LU 402. As shown in FIG. 11, the storage apparatus 110 which receives a request to write to the compressed LU 402 from the host 101 immediately transfers write data to the cache memory 125. The storage apparatus 110 then transmits a status response signifying that write processing is complete to the host 101.

The storage apparatus 110 starts compression processing asynchronously to the processing of the I/O from the host 101. The compression processing is started when dirty data in the cache memory 125 (data which has not been written to the HDD) is equal to or greater than a threshold or when the CPU load is low (in cases where there are few I/O requests from the host), and so on.

When the compression processing is started, the I/O processing program 133 performs processing to supplement the compressed data. Compressed data supplementation processing by the I/O processing program 133 is processing to keep the size of the compression target data at a fixed size. If the uncompressed data is compressed, as mentioned earlier, although the compression is performed using compression target data size units, there is no relationship between the write size from the host and the compression target data size, and hence the write size may also be overwritten if small in comparison with the compression target data size. In order to make the overwrite data consistent with the existing storage data, the I/O processing program 133 temporarily reads and expands the compressed data which has been compressed and stored, and overwrites same with expanded data only in the range written by the host.

The I/O processing program 133 compresses uncompressed data whose compression target data size has been curbed by the supplementation processing and stores the data once again in the compressed LU chunk 411. At this time, the post-compression data will likely be increased or reduced relative to the size of the existing storage data. If the post-compression data is greater than the existing storage data and the page usage amount of the compressed LU chunk increases, the I/O processing program 133 references the unused area management bitmap 137 and secures an unused page. The I/O processing program 133 then stores the corresponding increase in the compressed data in the secured page and updates the page of the unused area management bitmap 137 to 1. The I/O processing program 133 also updates the compressed LU mapping table 136.

Figure 12A:
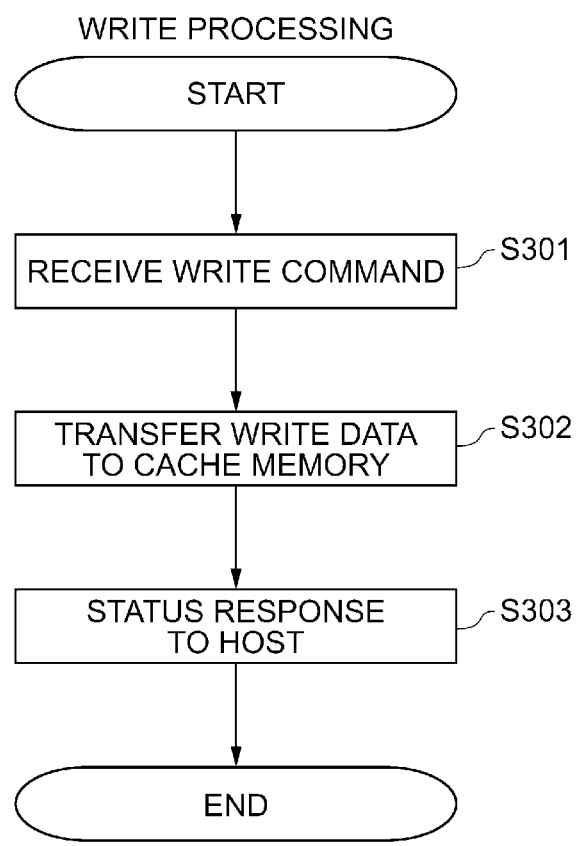
FIG. 12A is a flowchart showing data write processing according to this embodiment.

FIG. 12A is a flowchart showing processing to write data to the compressed LU 402. As shown in FIG. 12A, the storage apparatus 110 first receives a write request from the host 101 (S301). The I/O processing program 133 then transfers the write data to the cache memory 125 (S302) and transmits a status response indicating completion of writing to the host 101 (S303).

Figure 12B:
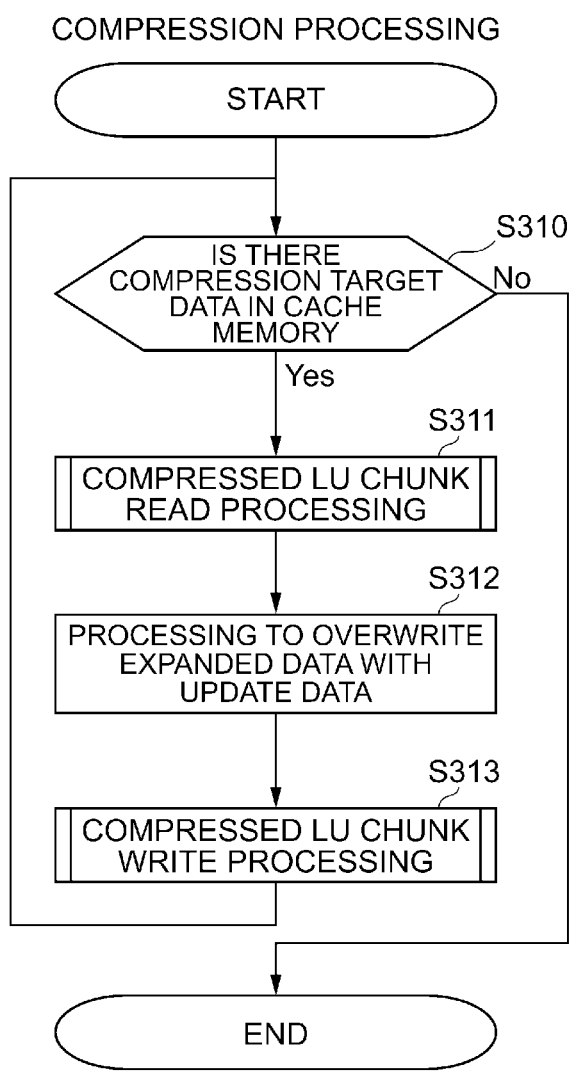
FIG. 12B is a flowchart showing compression processing according to this embodiment.

FIG. 12B is a flowchart showing compression processing. The storage apparatus 110 starts compression processing asynchronously to write processing in response to an I/O request of the host 101. When the compression processing is started, the compression/expansion program 135 first determines whether or not there is compression target data in the cache memory 125 (S310). Compression target data signifies data (dirty data) which has been transferred from the host 101 to the cache memory 125 but which has not yet been written to the HDD 111.

If it is determined in step S310 that there is no compression target data, the compression/expansion program 135 ends the processing.

If it is determined in step S310 that there is compression target data, the compression/expansion program 135 executes compressed data supplementation processing by means of read processing of the compressed LU chunk 411 (S311). The compressed data supplementation processing in step S311 is the same as the processing of steps S202 to S205 (processing A) shown in FIG. 10. In other words, the compression/expansion program 135 executes read processing from the compressed LU chunk 411 and compressed data expansion processing for parts with an insufficient compression target data size which have an address close to the compression target data.

Further, the compression/expansion program 135 overwrites the data which is expanded in step S311 with update data (S312).

The compression/expansion program 135 then recompresses the data which is overwritten in step S312 and stores this data in the compressed LU chunk 411 (S313). The processing to write to the compressed LU chunk is the same as the processing of steps S105 to S109 (processing B) in FIG. 8. That is, the compression/expansion program 135 executes compression processing and, depending on the case, references the unused area management bitmap 137, specifies a storage area, and stores the compressed data in the compressed LU chunk. Further, the compression/expansion program 135 updates the compressed LU mapping table 136 and the unused area management bitmap 137.

(7) Details of Copy Processing

LU copy processing will be described next. In the processing to copy an uncompressed LU, a copy instruction designating a copy source LU number (P-VOL) and a copy destination LU number (S-VOL (Secondary Volume)) is transmitted from the management terminal 102 to the storage apparatus 110. The storage apparatus 110 which receives the copy instruction sequentially reads data from the start of the logical address of the P-VOL which is the copy source to the cache memory 125, copies the data to the S-VOL area in the cache, and stores the data in the storage destination of the S-VOL which is the copy destination.

(7-1) Details of Conventional Copy Processing

Figure 17:
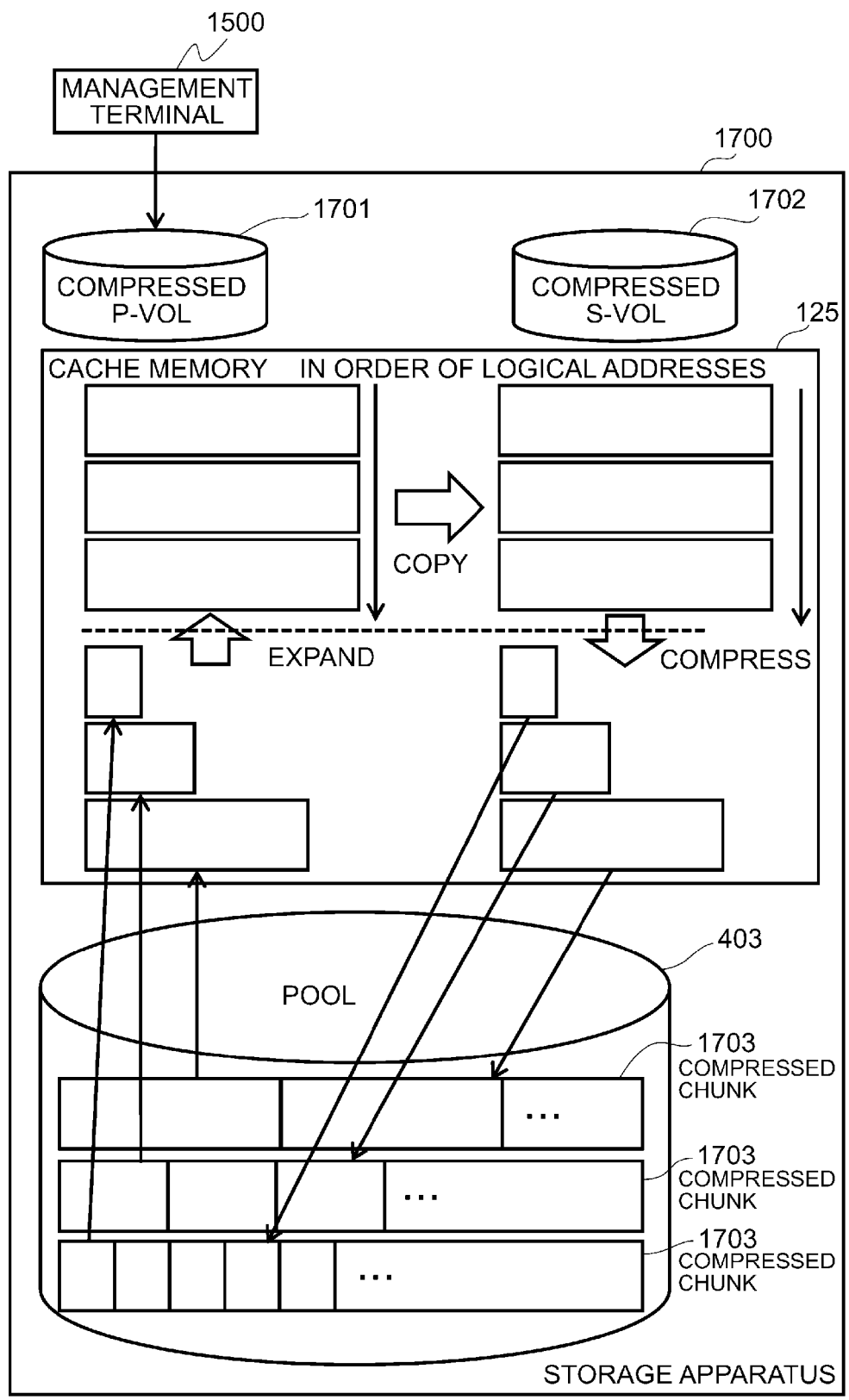
FIG. 17 is a conceptual diagram illustrating compressed data copy processing of the prior art.

Here, compressed data copy processing which is disclosed in PTL1 will be described with reference to FIG. 17. FIG. 17 shows a conceptual diagram in a case where copying of an LU storing compressed data is executed by a conventional storage apparatus 1700. The compressed P-VOL 1701 shows the copy-source LU. Further, the data which is stored in the compressed P-VOL 1701 is compressed data. The compressed S-VOL 1702 shows a copy destination LU. In a case where copying is performed from the compressed P-VOL 1701 to the compressed S-VOL 1702, the compressed data is stored in the compressed S-VOL 1702.

The compressed LU chunk 1703 is a chunk which stores compressed data. In PTL1, the data of two LU may be stored in the same chunk because the optimum chunk is selected according to the post-compression data size.

Upon receiving a copy instruction designating the compressed P-VOL 1701 and the compressed S-VOL 1702 from the management terminal 102, the storage apparatus 1700 references the compressed LU mapping table (not shown) and reads the compressed data from the start of the logical address of the compressed P-VOL 1701 to the cache memory 125. The compressed data is stored discretely in a plurality of chunks and hence, even if the data is read in the order of the logical address of the compressed P-VOL 1701, physically, reading takes place using random access.

In addition, because no mechanism for copying compressed data is provided in PTL1, copying must be performed after expanding compressed data which is read. It is also necessary to recompress the copied data to generate the storage data of the compressed S-VOL 1702. Further, the compressed LU mapping table (not shown) must be reconstructed for use by the compressed S-VOL.

As described earlier, when a copy of the compressed P-VOL 1701 is made by the storage apparatus 1700 disclosed in PTL1, reading takes place using random access, and expansion processing and reconstruction of the compressed LU mapping table, and so on, occur, and hence there is a problem in that the copy time is longer than for an uncompressed LU even though the data has been compressed and the data size is small. Therefore, in this embodiment, the time for copying a compressed volume is shortened by means of the copy processing shown below.

(7-2) Overview of Copy Processing of the Embodiment

Figure 13:
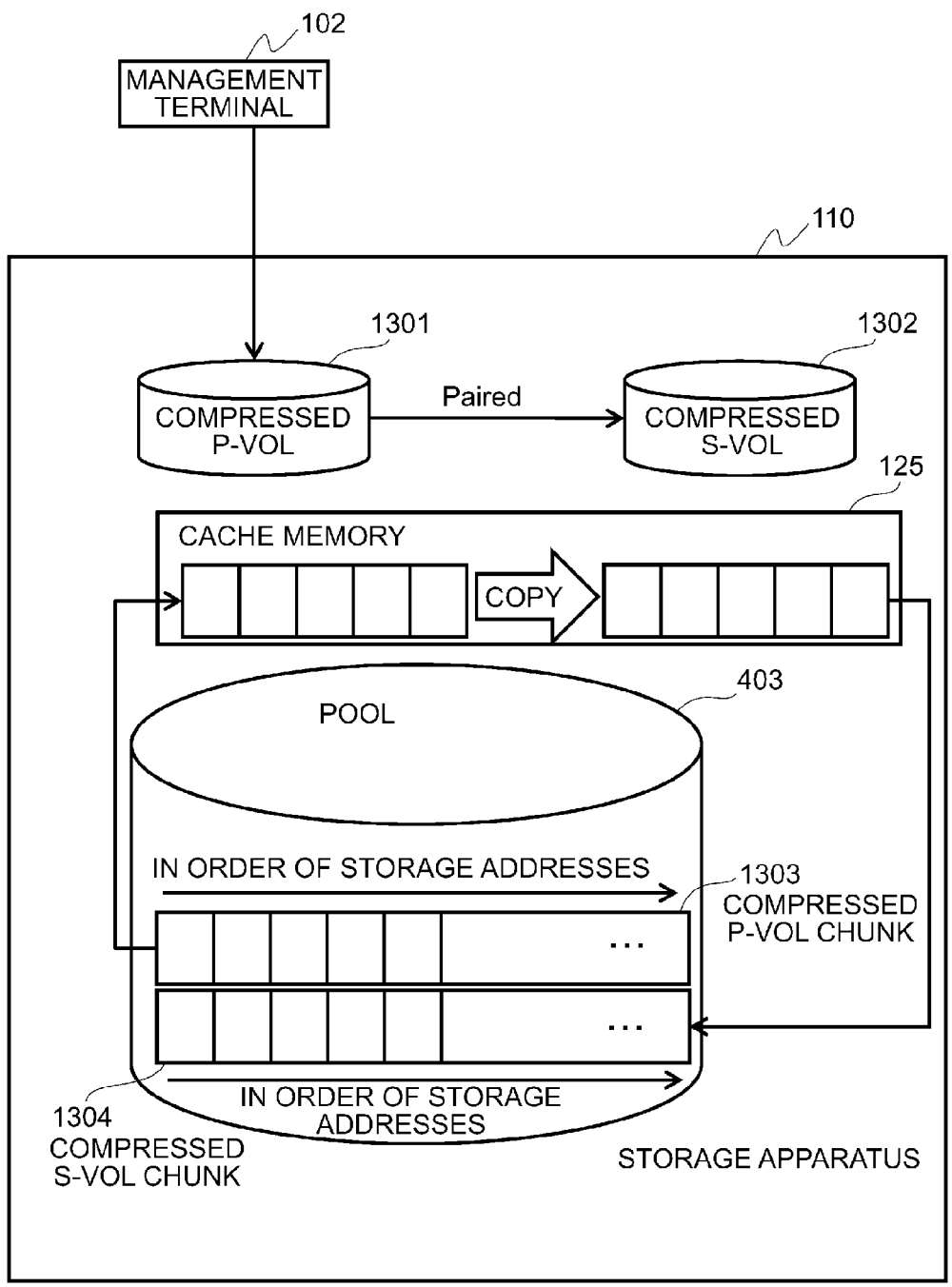
FIG. 13 is a conceptual diagram illustrating compressed P-VOL copy processing according to this embodiment.

FIG. 13 is a conceptual diagram illustrating copy processing of a compressed P-VOL according to the present invention. A compressed P-VOL 1301 represents a copy source LU which stores compressed data. The compressed S-VOL 1302 represents a copy destination LU. If a copy is made from the compressed P-VOL 1301 to the compressed S-VOL 1302, compressed data is stored in the compressed S-VOL 1302 in the same way as for the compressed P-VOL. Note that, if copying is performed, the compressed P-VOL 1301 and the compressed S-VOL 1302 are in a paired state and writing to the compressed S-VOL is prohibited. A compressed P-VOL chunk 1303 is a chunk which corresponds to the compressed P-VOL 1301 and stores compressed data. The compressed S-VOL chunk 1304 is a chunk which corresponds to the compressed S-VOL 1302. The same value is set for a page size 703 of the compressed P-VOL chunk 1303 and the compressed S-VOL chunk 1304.

When a copy instruction designating the compressed P-VOL 1301 and the compressed S-VOL 1302 is received from the management terminal 102, the storage apparatus 110 starts the LU copy program 134.

The LU copy program 134 references the chunk management table 138 and acquires the chunk # (compressed P-VOL chunk 1303) storing compressed data from the LU# which corresponds to the compressed P-VOL 1301. Thereafter, the LU copy program 134 reads to the cache memory 125 in the order of the storage address of the compressed P-VOL chunk 1303 and not in the order of the logical address of the compressed P-VOL 1301.

The LU copy program 134 then copies the read compressed data to the compressed S-VOL area as is without expanding the data and stores the data in the compressed S-VOL chunk 1304. Thereupon, if there is a page where no data is stored in the compressed P-VOL chunk 1303, the LU copy program 134 does not store data in the same way as the compressed P-VOL chunk 1303 on the same page of the compressed S-VOL chunk 1304.

Thus, sequential copying in the order of the address in the chunk can be realized by copying the compressed P-VOL chunk 1303 and the compressed S-VOL chunk 1304 in exactly the same state. Further, since copying is not performed in the order of the logical address, there is no need to expand the compressed data. As mentioned earlier, with this embodiment, high-speed copy processing can be realized.

(7-3) Details of Copy Processing

Figure 14:
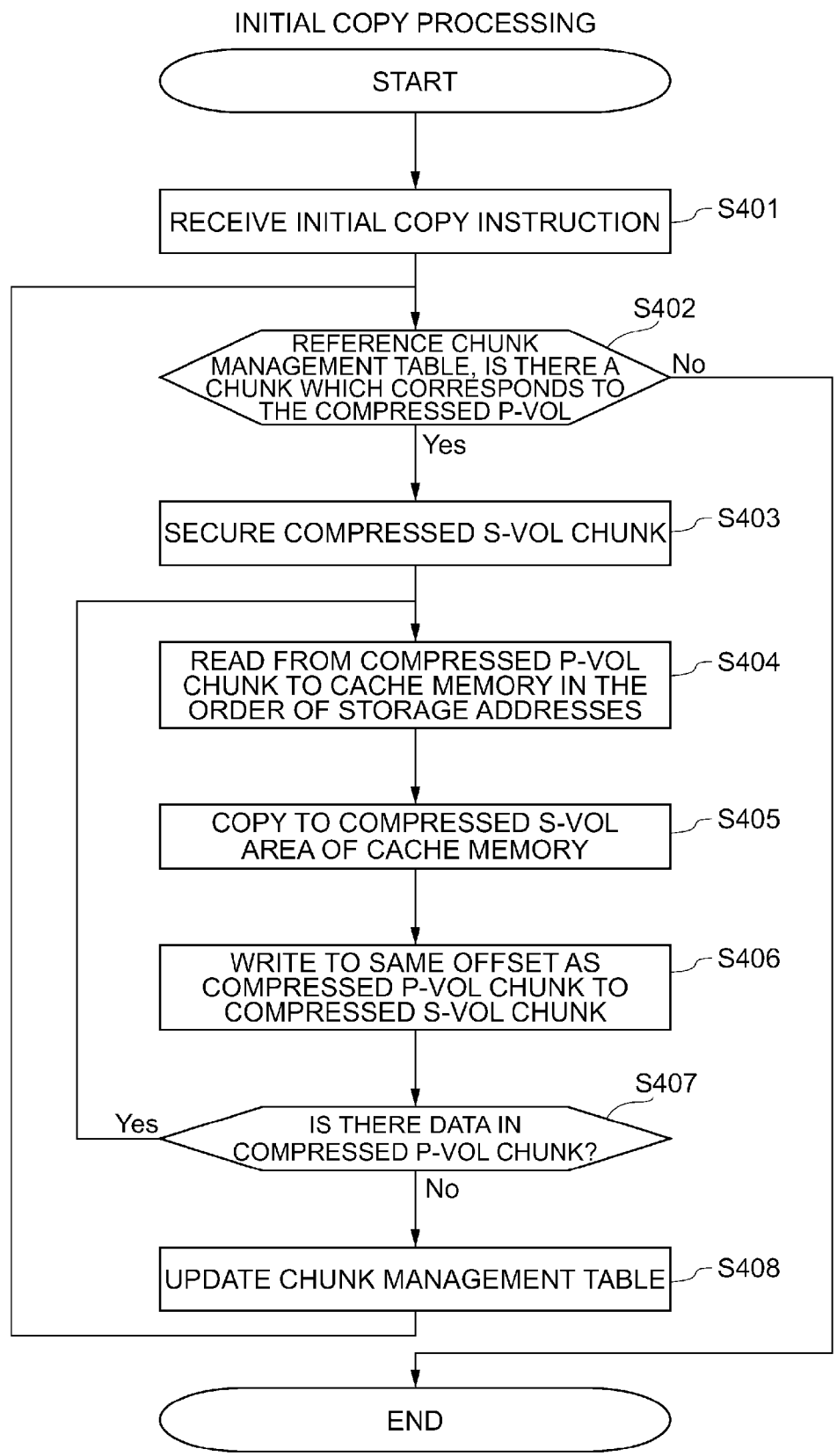
FIG. 14 is a flowchart showing compressed P-VOL copy processing according to this embodiment.

FIG. 14 is a flowchart showing copy processing of the compressed P-VOL 1301. As shown in FIG. 14, the storage apparatus 110 first receives a copy instruction which contains information on the compressed P-VOL and the compressed S-VOL from the management terminal 102 (S401).

Further, the LU copy program 134 references the chunk management table 138 and determines whether the chunk exists from the LU number corresponding to the compressed P-VOL 1301 (S402). In the case of an initial copy, if the designated LU number is not found in the chunk management table 138, the LU copy program 134 notifies the management terminal 102 that the LU number designation by the management terminal 102 is incorrect and ends the processing.

If it is determined in step S402 that the designated LU number has been found in the chunk management table 138, the LU copy program 134 secures the compressed S-VOL chunk 1304 which is the copy destination area (S403).

More specifically, the LU copy program 134 adds information of the compressed S-VOL chunk 1304 to the chunk management table 138. The page size of the compressed S-VOL chunk 1304 is set at the same value as the compressed P-VOL chunk 1303. Further, the values of the compressed LU mapping table address 705 and the unused area management bitmap address 706 are configured with the same addresses as the information corresponding to the compressed P-VOL chunk 1303. As a result, because the data storage states of the compressed P-VOL 1301 and the compressed S-VOL 1302 can be the same state, sequential copy processing can be executed without further processing of the compressed data. There is also no need to reconstruct the compressed LU mapping table 136 of the compressed S-VOL 1302 and the compressed LU mapping table 136 of the compressed P-VOL 1301 can be used for the compressed S-VOL 1302.

Further, the amount of memory used can be reduced because the compressed LU mapping table 136 and the unused area management bitmap 137 which correspond to the compressed S-VOL 1302 are also common to the compressed P-VOL 1301.

In addition, in a case where the paired state of the compressed P-VOL and the compressed S-VOL is released (split state), writing to the compressed P-VOL and the compressed S-VOL is executed independently. In this case, the LU copy program 134 copies the compressed LU mapping table 136 and the unused area management bitmap 137 which correspond to the compressed S-VOL and updates the values of the compressed LU mapping table address field 1384 and the unused area management bitmap address field 1385 of the chunk management table 138. As a result, writing to the compressed S-VOL in the split state can also be executed normally.

Further, the LU copy program 134 references the chunk management table 138, acquires the compressed P-VOL chunk 1303 storing the compressed P-VOL data, and reads the compressed data from the start of the chunk to the cache memory 125 in the order of the storage addresses (S404).

The LU copy program 134 then copies the compressed data which is read in step S404 as is to the compressed S-VOL cache area (S405). The LU copy program 134 then stores compressed data, which has been copied to the compressed S-VOL cache area, in the compressed S-VOL chunk 1304 (S406). Thereupon, the storage address of the compressed S-VOL chunk 1304 is configured with exactly the same offset as the compressed P-VOL chunk 1303 (the offset address in the chunk).

Thereafter, the LU copy program 134 determines whether or not there is still data to be copied to the compressed P-VOL chunk 1303 (S407). If it is determined in step S407 that there is data to be copied in the compressed P-VOL chunk 1303, the LU copy program 134 repeats the processing of step S404 and subsequent processing. If, on the other hand, copying of all the data in the compressed P-VOL chunk 1303 is complete, the LU copy program 134 updates the information of the compressed S-VOL chunk 1304 of the chunk management table 138 (S408).

After executing the processing of step S408, the LU copy program returns once again to step S402 and references the chunk management table 138 to determine whether or not the chunk exists from the LU number corresponding to the compressed P-VOL 1301. If it is determined in step S402 that the chunk does not exist, the LU copy program determines that all the copy processing is complete and ends the LU copy processing.

(8) Paired State Write Processing

The write processing in a case where the P-VOL and the S-VOL are in a paired state after the LU copy processing will be described next. If the P-VOL and the S-VOL are in a paired state after copy processing of an uncompressed LU, writing to the S-VOL is in many cases not allowed, but when writing to the P-VOL is performed, the same content is also written to the S-VOL.

In the storage apparatus 110, write data which is received from the host 101 is copied in the cache memory and this data is stored to each of the storage destination disks P-VOL and S-VOL. In the foregoing PTL1, in cases where a compressed P-VOL and a compressed S-VOL are in a paired state, write data is copied in the cache memory when write processing to the P-VOL is performed. Therefore, compression processing is also executed for any write data in the P-VOL area and S-VOL area in the cache memory, and data is stored in each of the storage destinations. In other words, there is a problem in that the compression processing is executed a total of two times and the processing load is large. In this embodiment, as will be described hereinbelow, the processing load is lightened by executing the compression processing only once.

Figure 15:
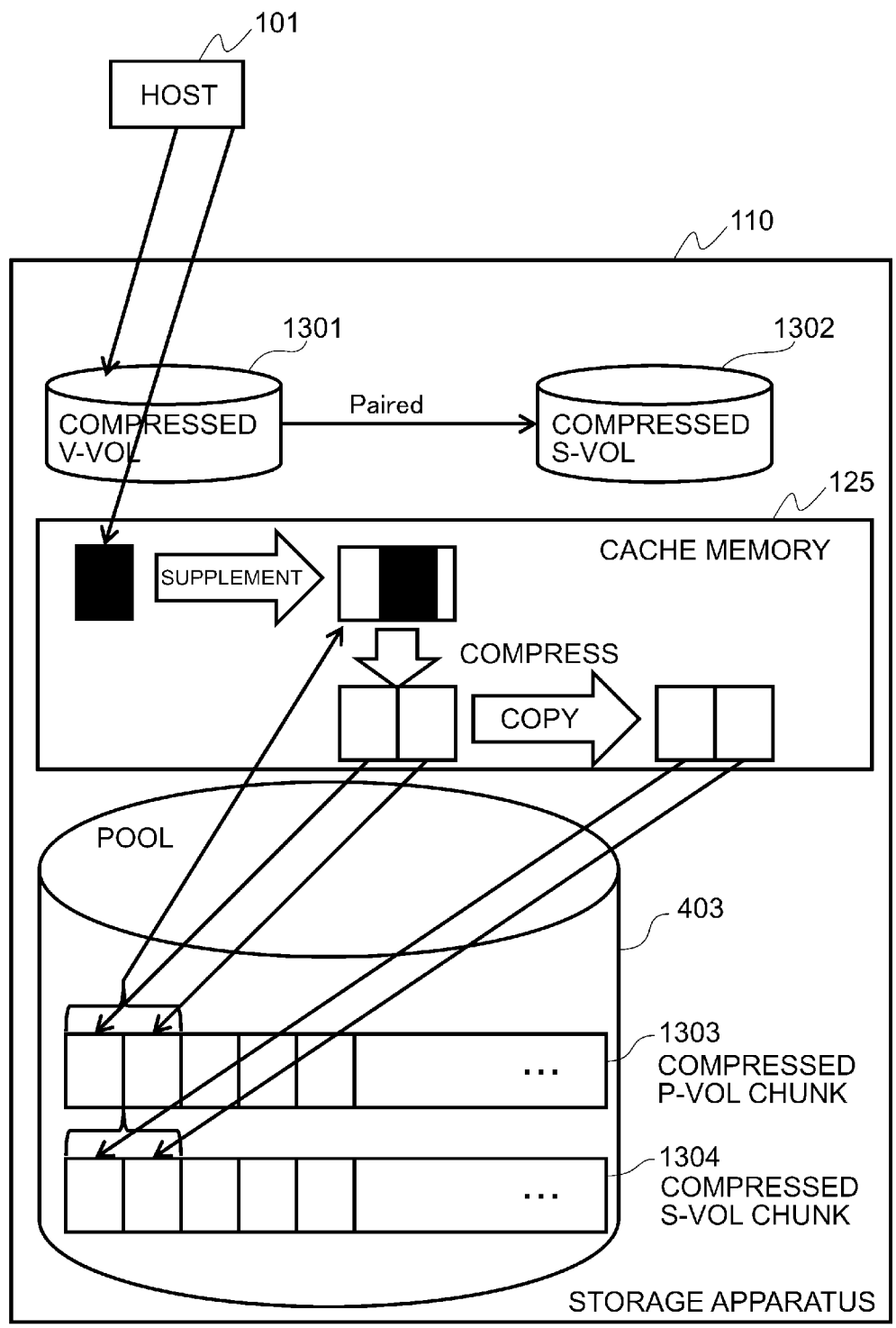
FIG. 15 is a conceptual diagram illustrating write processing in the case of a paired state according to this embodiment.

FIG. 15 is a conceptual diagram illustrating write processing in a case where the compressed P-VOL 1301 and the compressed S-VOL 1302 are in a paired state according to this embodiment. First, when a write request is issued from the host 101 to the compressed P-VOL 1301, write data is transferred to the cache memory 125. The storage apparatus 110 starts compression processing asynchronously to the write request from the host I/O, performs processing to supplement the compression target data size, and executes compression processing.

Thereafter, the storage apparatus 110 copies the compressed data to the S-VOL area in the cache memory and stores the compressed data in the compressed P-VOL chunk 1303 and the compressed S-VOL chunk 1304. According to this processing routine, compression processing can be executed once and copying to the compressed S-VOL 1302 can also be performed normally.

Figure 16A:
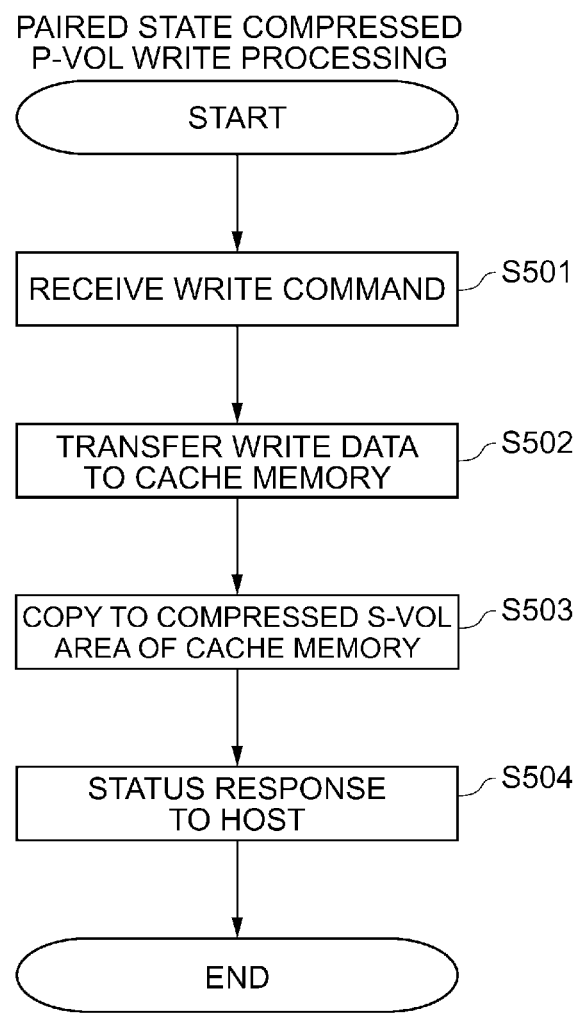
FIG. 16A is a flowchart illustrating write processing in the case of a paired state according to this embodiment.
Figure 16B:
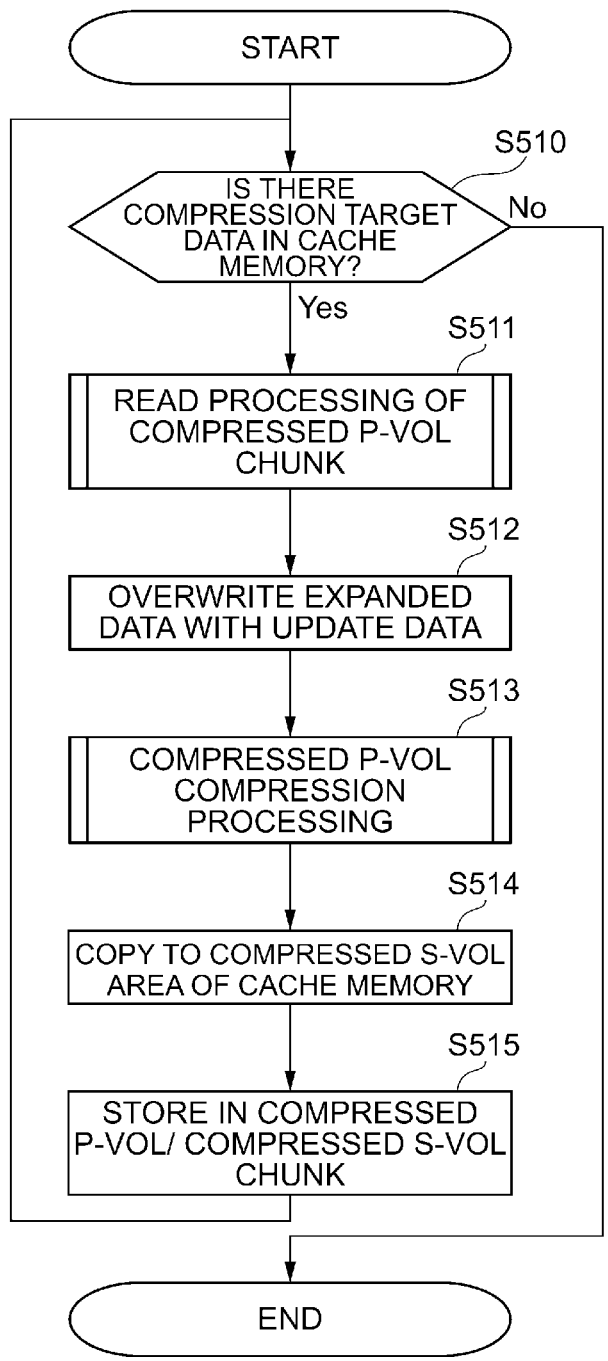
FIG. 16B is a flowchart showing compression processing in the case of a paired state according to this embodiment.

FIGS. 16A and 16B are flowcharts showing write processing to, and compression processing of, the compressed P-VOL 1301 in a case where the compressed P-VOL 1301 and the compressed S-VOL 1302 are in a paired state.

As shown in FIG. 16A, the storage apparatus 110 receives a write request to write to the compressed P-VOL 1301 from the host 101 (S501). The I/O processing program 133 then transfers write data to the cache memory 125 (S502).

The LU copy program 134 then copies the write data of the cache memory 125 to the S-VOL area of the cache memory (S503). The data which is to be copied to the compressed S-VOL 1302 is compressed data and therefore step S503 can be omitted. However, when the paired state between the compressed P-VOL 1301 and the compressed S-VOL 1302 is released, because I/Os are allowed from the host to the compressed S-VOL 1302, there is the advantage that write data is copied to the S-VOL of the cache memory and the cache hit rate improves.

Thereafter, the LU copy program 134 transmits a status response indicating write completion to the host (S504).

Further, the storage apparatus 110 starts compression processing asynchronously to the I/O request from the host 101. The compression processing is started, similarly to the foregoing compression processing, in cases where the dirty data (data which has not been written to the HDD) in the cache memory 125 is equal to or greater than a threshold or where the CPU load is low (there are few I/O requests from the host), and so on.

As shown in FIG. 16B, when the compression processing is started, the compression/expansion program 135 determines whether or not compression target data is in the cache memory 125 (S510). Compression target data is data (dirty data) which has been transferred from the host 101 to the cache memory 125 but which has not yet been written to the HDD 111.

If it is determined in step S510 that there is no compression target data in the cache memory 125, the compression/expansion program 135 ends the processing.

If, on the other hand, it is determined in step S510 that there is compression target data in the cache memory 125, the compression/expansion program 135 executes compressed data supplementation processing by means of read processing of the compressed LU chunk 1303 (S511). The compressed data supplementation processing in step S511 is the same as the processing (processing A) of steps S202 to S205 in FIG. 10. In other words, the compression/expansion program 135 executes read processing from the compressed LU chunk 411 and compressed data expansion processing for parts with an insufficient compression target data size which have an address close to the compression target data.

The compression/expansion program 135 then overwrites the data which is expanded in step S1606 with update data (S512).

The compression/expansion program 135 then recompresses the data which is overwritten in step S512 (S513). The compression processing of step S513 is the same as steps S105 to S108 (processing C) in FIG. 8. That is, the compression/expansion program 135 executes compression processing and, depending on the case, references the unused area management bitmap 137 and specifies a storage area. Further, the compression/expansion program 135 updates the compressed LU mapping table 136 and the unused area management bitmap 137.

The compression/expansion program 135 then copies the compressed data which is compressed in step S513 to the S-VOL area of the cache memory 125 (S514), and stores the compressed data in each of the compressed P-VOL chunk 1303 and the compressed S-VOL chunk 1304 (S515).

(9) Advantageous Effects of Embodiment

As described hereinabove, with this embodiment, the storage apparatus 110 is provided in which the pool management program 132 of the storage apparatus 110 provides the virtualized logical volume 401 to the host 101, manages the storage area provided by the HDD 111 as the pool 403, and, on the basis of a data I/O request from the host 101, assigns the storage area of the pool 403 to the logical volume 401. The storage apparatus 110 divides the pool 403 into a plurality of chunks containing a plurality of pages storing data, compresses data which is written to the logical volume 401 by the host 101, assigns one of a plurality of chunks to the compressed data logical volume 402 where compressed data is stored and, when the compressed data logical volume 402 is compressed, the page length of the chunk which is assigned to the compression logical volume which is the copy source and the page length of the chunk which is assigned to the compression data logical volume which is the copy destination are the same length. As a result, when the logical volume which stores the compressed data is copied, high-speed copying is possible without the need for random-access reading, compressed data expansion, or reconstruction of the compressed LU mapping table, and so forth.

(10) Other Embodiments

Note that the present invention is not limited to the foregoing embodiment and encompasses various modifications. For example, although various programs, management tables, and bitmaps are recorded in the involatile memory 130, same may also be recorded in the HDD 111. The foregoing embodiment is described in detail for the purpose of making the present invention easy to understand but is not limited to comprising all the configurations described. Further, part of the configuration of a certain embodiment can be replaced with a configuration of another embodiment. Configurations of other embodiments can also be added to the configuration of a certain embodiment. Moreover, other configurations can also be added to, deleted from or replace part of the configuration of each embodiment.

Furthermore, part or all of each of the foregoing configurations, functions, processing units, and processing means and so on may also be realized by hardware by means of an integrated circuit design or the like, for example. Further, each of the foregoing configurations and functions and the like may also by realized by software as a result of a processor interpreting and executing programs which implement the respective functions. Programs and information such as tables and files for realizing each of the functions can be placed in a recording device such as a memory, HDD, or SSD (Solid State Drive) or the like or on a recording medium such as an IC card, an SD card, or a DVD.

Moreover, In addition, control lines and information lines which are considered necessary for the description are shown but not all the control lines and information lines need necessarily be shown for manufacturing purposes. In reality, mutually coupling almost all the configurations may also be considered.

REFERENCE SIGNS LIST

101 Host
102 Management terminal
110 Storage apparatus
123 CPU
124 Main memory
125 Cache memory
130 Involatile memory
131 Management terminal communication program
132 Pool management program
133 I/O processing program
134 LU copy program
135 Compression/expansion program
136 Compressed LU mapping table
137 Unused area management bitmap
138 Chunk management table

The invention claimed is:

1. A storage apparatus which is coupled via a network to a host which issues data I/O requests, the storage apparatus comprising:
a storage unit configured to store data which is read and/or written by the host; and
a control unit which is configured to:
provide logical volumes including a compressed data logical volume for the host,
manage storage areas which are provided by the storage unit as a pool, wherein the pool is divided into a plurality of chunks having a plurality of pages, and each of the chunks is associated with at least one of the logical volumes, wherein each of the chunks has a storage address;
compress data which is written to the compressed data logical volume by the host, and
allocate a page in a chunk which is associated with the compressed data logical volume to the compressed data logical volume,
wherein, when making a copy of the compressed data logical volume, the control unit is further configured to:
assign a chunk having pages of the same size as the page in the chunk associated with the compressed data logical volume to a copy destination logical volume, and
copy data of the compressed data logical volume in order of a storage address of the chunk associated with the compressed data logical volume without decompressing the data.

2. The storage apparatus according to claim 1,
wherein the logical volume further includes an uncompressed logical volume provided for the host,
wherein a size of a page in a chunk which is associated with the uncompressed logical volume is different from the size of the page in the chunk associated with the compressed logical volume.

3. The storage apparatus according to claim 1,
wherein the control unit is configured to manage, in a mapping table, the storage address of each page in the chunk associated with a logical address of the compressed data logical volume, and
wherein the storage address of each page corresponds to an offset address in the chunk.

4. The storage apparatus according to claim 3,
wherein the control unit is configured to employ the same mapping table for the compressed data logical volume and the copy destination logical volume of the compressed data logical volume.

5. The storage apparatus according to claim 2, wherein the control unit is configured to:
receive a request to change an attribute of the uncompressed logical volume to a compressed logical volume,
read data stored in the chunk associated with the uncompressed logical volume,
compress the read data, and
store the compressed read data in the chunk associated with the compressed logical volume whose attribute is changed to the compressed logical volume,
wherein a size of the page in the chunk which is associated with the compressed logical volume is different from the size of the page in the chunk associated with the uncompressed logical volume.

6. The storage apparatus according to claim 1,
wherein, in a case where the compressed data logical volume and the copy destination logical volume are in a pair state, the control unit is configured to:
receive a write request to the compressed data logical volume from the host,
read compressed data corresponding to write data of the write request from the chunk associated with the compressed logical volume to a cache memory,
overwrite the read compressed read data with the write data of the write request,
copy the overwritten data in the cache memory to a cache memory for the destination logical volume, and
store the overwritten data in the chunk associated with the compressed logical volume and the destination logical volume.

7. A method of managing data to be stored in a storage apparatus which is coupled via a network to a host which issues data I/O requests, the method comprising:
storing, in a storage unit, data which is read and/or written by the host;
providing, in a control unit, a plurality of logical volumes including a compressed data logical volume for the host;
managing storage areas which are provided by the storage unit as a pool, the pool being divided into a plurality of chunks having a plurality of pages, and each of the chunks being associated with at least one of the logical volumes and having a storage address;
compressing data which is written to the compressed data logical volume by the host, and
allocating a page in a chunk which is associated with the compressed data logical volume to the compressed data logical volume,
wherein the method further comprises copying the compressed data logical volume, and
wherein copying the compressed data logical volume comprises assigning a chunk having pages of the same size as the page in the chunk associated with the compressed data logical volume to a copy destination logical volume, and copying data of the compressed data logical volume in order of a storage address of the chunk associated with the compressed data logical volume without decompressing the data.

8. The method of managing data according to claim 7, wherein the logical volume further includes an uncompressed logical volume provided for the host, wherein a size of a page in a chunk which is associated with the uncompressed logical volume is different from the size of the page in the chunk associated with the compressed logical volume.

9. The method of managing data according to claim 7, further comprising:

managing, in a mapping table, the storage address of each page in the chunk associated with a logical address of the compressed data logical volume, wherein the storage address of each page corresponds to an offset address in the chunk.

10. The method of managing data according to claim 9, wherein the managing the storage address comprises employing the same mapping table for the compressed data logical volume and the copy destination logical volume of the compressed data logical volume.

11. The method of managing data according to claim 8, further comprising:

receiving a request to change an attribute of the uncompressed logical volume to a compressed logical volume, reading data stored in the chunk associated with the uncompressed logical volume, compressing the read data, and storing the compressed read data in the chunk associated with the compressed logical volume whose attribute is changed to the compressed logical volume, wherein a size of the page in the chunk which is associated with the compressed logical volume is different from the size of the page in the chunk associated with the uncompressed logical volume.

12. The method of managing data according to claim 7, wherein, in a case where the compressed data logical volume and the copy destination logical volume are in a pair state, the method further comprises:

receiving a write request to the compressed data logical volume from the host, reading compressed data corresponding to write data of the write request from the chunk associated with the compressed logical volume to a cache memory, overwriting the read compressed read data with the write data of the write request, copying the overwritten data in the cache memory to a cache memory for the destination logical volume, and storing the overwritten data in the chunk associated with the compressed logical volume and the destination logical volume.

* * * * *